Patented June 30, 1953

2,644,019

UNITED STATES PATENT OFFICE 2,644,019

CURING OF RUBBER CEMENTS

Thomas C. Morris, Lexington, and Eric C. Johnson, Somerville, Mass., assignors to B. B. Chemical Co., Boston, Mass., a corporation of Massachusetts No Drawing. Application April 8, 1949, Serial No. 86,404

11 Claims. (Cl. 260—792)

This invention relates to vulcanizing agents and compositions and particularly to liquid vulcanizable adhesive compositions.

Vulcanizable compositions, in general, comprise free sulphur, a vulcanization accelerator, zinc oxide, and other conventional ingredients. In vulcanizable liquid rubber cements, whether of the organic solvent solution type or of the aqueous dispersion or latex type, a number of problems arise which do not exist or are not of extreme importance in conventional compounding of stocks for press cures or open steam cures. With the conventional press cures, for example, the sulphur, accelerator and other ingredients are so adjusted that vulcanization takes place after the stock has filled the mold and the temperature has been raised to temperatures of 250°–325° F. In such stocks, the sulphur, accelerator and other vulcanizing ingredients are of such types and in such proportions that the stocks may be held at room temperature for extended periods with little or no evidence of vulcanization. Where cemented bonds may be subjected to such temperatures, the cements may be made by simply dissolving such stocks in a suitable solvent.

However, there is a demand for solvent type cements which vulcanize at room temperature. Cements containing all of the ingredients necessary for vulcanization at room temperature cannot be stored or shipped as such because the cement would gel or vulcanize in the solvent. It is customary in such cases to make what is known as two-part cements. One part of the two-part cement contains the sulphur, zinc oxide and possibly other ingredients dispersed in the rubber, and the other part contains a vulcanization accelerator dispersed in the rubber. The compositions of the parts are so adjusted that when the parts are mixed in definite proportions, the ingredients in the mixed cement are present in the proportions required to effect a cure at room temperature. One of the chief disadvantages of this type of cement is that many accelerators have a marked degrading effect on the rubber, so that on long standing, i. e., several months, a cement originally having substantial viscosity will become almost water thin and useless. Other accelerators, even in the absence of sulphur will cause gelation to such a degree that the cement becomes useless.

A second type of two-part solvent cement which avoids shipping and storing the accelerator in contact with rubber comprises a first part containing the rubber, solvent and all other ingredients excepting the accelerator and a second part comprising a liquid accelerator which can be added to and is readily miscible with the first part so that uniform distribution of the accelerator in the cement may be obtained by a short period of mixing. Accelerators which are powders of low solubility in organic solvents cannot be used in this second type because of the difficulty of obtaining the proper degree of dispersion in the rubber containing solution.

It has also been found that all room temperature curing solvent cements having free sulphur in the formulation produce hydrogen sulphide. The amount of hydrogen sulphide produced is ordinarily sufficient to give, at least for a short period, a disagreeable odor to the cement. Even where the odor of hydrogen sulphide is not objectionable, it has been found that other undesirable effects may be observed. For example, vinyl chloride polymer compositions often contain lead compounds as heat stabilizers. Cements containing free sulphur which are applied to such compositions will form, after a period, a brownish stain in the compositions presumably due to the action of the hydrogen sulphide on the lead. This brownish stain is particularly noticeable and objectionable on the lighter shades of vinyl material.

Certain accelerators such as di-penta-methylene - thiuram - tetrasulfide contains sufficient available sulphur within the molecule to effect vulcanization at room temperature within a reasonable time without addition of free sulphur; and properly compounded rubber cements containing such an accelerator and zinc oxide will cure in contact with a vinyl compound containing lead without developing a brown stain. Unfortunately, these compounds are, in general, not sufficiently soluble to form solutions capable of use as the second part of a two-part cement; and of course these compounds would cause premature gelling or vulcanization of a rubber solution if incorporated in a rubber solution which must be stored.

It is a feature of the present invention to provide a new combination product serving as both vulcanizing agent and accelerator which does not evolve hydrogen sulfide during curing and which is readily soluble in organic solvent materials for convenient incorporation into the vulcanizable rubber part of an adhesive composition.

It is a further feature of the invention to provide improved liquid adhesives containing a vulcanizing and accelerating material which functions to give an improved type of vulcanization without the liberation of hydrogen sulfide.

In accordance with the present invention there is reacted a zinc dithiocarbamate with a thiuram sulfide. These materials combine to form a product which is distinguished from the initial materials in solubility and in vulcanizing action, being capable of reacting with the sulphur vulcanizable rubbers, both natural and synthetic, to vulcanize them without detectible evolution of hydrogen sulfide. A number of these compounds are quite soluble in organic liquids and hence are readily incorporated in organic solvent type rubber cements. These solutions of the vulcanizing agent in organic solvents are readily dispersible in water to form an aqueous dispersion which may be incorporated into latices of vulcanizable rubbers to provide curing type latex cements.

We have discovered that two mols of a zinc dithiocarbamate will combine with one mol of a thiuram disulfide or tetrasulfide dispersed in an aromatic hydrocarbon solvent to form a compound possessing excellent rubber vulcanization properties. The combination of the reactants takes place in a few hours at room temperature and may occur in a period as short as fifteen minutes at temperatures of 50° to 60° C. The compound formed is presumably of the association or Werner complex type. These combination products possess useful solubility characteristics in that certain members are capable of forming stable solutions which may be incorporated in liquid solutions of sulphur vulcanizable rubbers to form vulcanizing rubber compositions useful for adhesive and coating purposes.

A preferred vulcanizing agent is the product of the combination of a zinc dithiocarbamate and dipentamethylenethiuramtetrasulfide. This product is quite soluble in aromatic solvents such as xylol, benzol and other common aromatic liquid solvents. In xylol the solubility is in excess of 200 parts of the combination product to 100 parts of xylol by weight. This compound is an extremely active vulcanizing agent at room temperature and addition to a rubber cement of as little as 4% of the combination product by weight of the rubber content of the cement will give vulcanization in three days at room temperature. It is important to note that in vulcanization with this very small proportion of vulcanizing agent, satisfactory vulcanization of the rubber occurs although there is only 0.29% of sulphur by weight of the rubber available for vulcanization. This proportion is very substantially less than the quantity of sulphur normally required with conventional vulcanizing agents and is indicative of a novel vulcanization mechanism.

Other vulcanizing agents, in accordance with the present invention, include combination products of various thiuram sulfides including dipentamethylenethiuramtetrasulfide, tetraethylthiuramdisulphide, and tetramethylthiuramdisulphide with various zinc dithiocarbamates including zinc dibutyldithiocarbamate, zinc diethyldithiocarbamate and zinc dimethyldithiocarbamate. These compounds may be combined in an aromatic hydrocarbon in the ratio of two mols of the zinc dithiocarbamate with one mol of the thiuram disulfide or tetrasulfide. These combination products vary somewhat in solubility and in vulcanization activity but are effective vulcanizing agents which may be combined with sulphur vulcanizable rubbers to cause vulcanization.

To improve the stability of the vulcanizing agents of the present invention, it has been found desirable in practice to use more than two mols of the zinc dithiocarbamate with one mol of the thiuram disulfide or tetrasulfide, a ratio of from 2.5 to 3 mols of the former to one mol of the latter giving vulcanizing agents of very good stability.

The above agents operate to vulcanize rubber without noticeable evolution of hydrogen sulfide and are of particular advantage in this respect. However, where the evolution of hydrogen sulfide is not objectionable these vulcanizing agents may be employed in combination with free sulphur. When used with sulphur, these compounds present the advantage that their solubility in aromatic solvents renders them easily dispersible; and their high activity cooperates with the sulphur to achieve a highly satisfactory rapid cure.

The vulcanizing agents of the present invention may, as explained above, be employed in the form of solutions which may be incorporated with solutions of sulphur vulcanizable rubbers in an organic solvent to obtain curing rubber adhesives or coatings. Sulphur vulcanizable rubbers which may be used in such adhesive or coating compositions include natural rubber, butadiene acrylonitrile copolymer rubbers such as Hycar OR-15 (a butadiene acrylonitrile copolymer containing 55% of butadiene and 45% of acrylonitrile), Hycar OR-25 (a copolymer comprising 67% of butadiene and 33% of acrylonitrile), or Perbunan (a copolymer containing 75 parts of butadiene and 25 parts of acrylonitrile), butadiene styrene copolymer rubbers such as GRS, copolymers of isobutylene containing a proportion of butadiene such as butyl rubber, and other known sulphur vulcanizable rubbers.

The vulcanizing agents of the present invention offer many advantages fitting them for use in vulcanizing latex compositions. Ordinary procedure in the manufacture of latices involves forming an aqueous dispersion of the compounding ingredients by ball milling the ingredients such as zinc oxide, sulphur, accelerator antioxidant, etc. in a ball mill with water and dispersing and wetting agents. This ball milling operation may require from twenty-four to seventy-two hours to obtain satisfactory subdivision and dispersion of the ingredients. This operation is laborious and time-consuming and adds materially to the cost of vulcanizing latices.

For use in latices, the vulcanizing agents of the present invention have been found readily dispersible in an aqueous medium without ball milling or equivalent operation. The resulting dispersions may be combined with an aqueous dispersion or latex of a sulphur vulcanizable rubber. A preferred way for making such a dispersion involves forming a solution of the vulcanizing agent in an aromatic solvent liquid and dispersing the solution in an aqueous medium by means of dispersing agents. In making such dispersions it is important to maintain a relatively high pH in order that the dispersion may not coagulate or otherwise adversely affect the rubber latex or aqueous dispersion with which it is incorporated. The aqueous dispersions of the vulcanizing agent may, if desired, include a proportion of dispersed sulphur obtained for example by adding a commercial dispersion of sulphur to the dispersion of vulcanizing agent.

The following examples are given to aid in understanding the invention, but it is to be understood that the invention is not limited to the ingredients or proportions set forth in the examples:

*Example I.*—71.4 parts by weight of zinc dibutyldithiocarbamate were mixed with 20 parts by weight of xylol to form a stiff paste. The paste was heated to 70° C. and 28.6 parts by weight of dipentamethylenethiuramtetrasulfide were added. The paste rapidly thinned to a turbid liquid which was heated for 15 minutes at a temperature of from 65° to 75° C. A clear, dark brown liquid was obtained. A rubber cement was prepared as follows: 1,000 parts by weight of white crepe natural rubber, 250 parts by weight of a finely divided calcium silicate and 5.5 parts by weight of Agerite Alba (a rubber anti-oxidant comprising hydroquinone monobenzyl ether) were mixed in a Banbury mixer. 1,000 parts by weight of the above stock were dissolved in a mixture of 4500 parts of naphtha and 65 parts by weight of alcohol to form a noncuring rubber cement base. A curing cement was prepared by mixing 100 parts of the cement base with 0.8 part by weight of the vulcanizing agent solution. Films of the resulting cement painted on paper cured in three days at room temperature. Other films of the cement painted on paper were cured in 45 minutes at 185° F.

*Example II.*—A mixture was prepared comprising 23.8 parts of tetraethylthiuramdisulphide, 76.2 parts of zinc dibutyldithiocarbamate, and 30 parts of a high aromatic mineral oil fraction known as Sovaloid C. The mixture was heated at 60° C. for 15 minutes and formed a clear, dark solution. With the solution there were combined 13 parts of oleic acid, 13 parts of morpholine, and 25 parts of a commercial anti-oxidant known as "Deenax." The resultant mixture is a viscous oil which disperses readily in water. 2.4 parts of water were added in successive small portions, with thorough mixing after each addition, to 2.4 parts of the above viscous oil, and the mixture combined with 0.8 part by weight of a commercial dispersion of sulphur in water containing 73% by weight of sulphur. The pH of the mixture was adjusted to 10 by the addition of a small amount of potassium hydroxide. The resulting mixture was combined with 100 parts by weight of a 60% solids natural rubber latex. The resulting latex was easily applied in various adhesive relations and a film deposited from the latex was cured in three days at room temperature.

*Example III.*—23.7 parts of dipentamethylenethiuramtetrasulfide and 76.3 parts of zinc dibutyldithiocarbamate were combined in 30 parts of a high aromatic mineral oil fraction (Sovaloid C) and the mixture permitted to stand overnight at room temperature. A clear, dark solution was obtained. With the resulting solution there were combined 13 parts by weight of oleic acid and 13 parts by weight of morpholine, and 25 parts by weight of a commercial anti-oxidant known as Deenax were dispersed in the mixture. 4.2 parts of water were added in small portions, with thorough mixing after each addition, to 4.2 parts of the above composition. This dispersion of vulcanizing agent was incorporated with 100 parts of a 60% natural rubber latex. Films of the mixture of vulcanizing agent dispersion and latex were painted on paper and were found to be vulcanized after two days at room temperature.

Having described our invention, what we claim as new and desire to secure by Letters Patent of the United States is:

1. The complex addition product of two mols of a zinc salt of a dialkyl dithiocarbamate wherein the alkyl group has from one to four carbon atoms and one mol of a thiuram sulfide having the following formula:

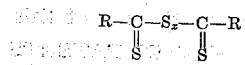

where $x$ is an even number not greater than four and R is a member of the group consisting of piperidyl and dialkyl amino groups wherein the alkyl group has not more than four carbon atoms.

2. The complex addition product of two mols of zinc diethyldithiocarbamate and one mol of dipentamethylenethiuramtetrasulfide.

3. The complex addition product of two mols of zinc dibutyldithiocarbamate and one mol of dipentamethylenethiuramtetrasulfide.

4. The complex addition product of two mols of zinc dibutyldithiocarbamate and one mol of tetraethylthiuramdisulfide.

5. A vulcanization agent comprising an aromatic hydrocarbon solvent solution of the complex addition product of two mols of zinc diethyldithiocarbamate and one mol of dipentamethylenethiuramtetrasulfide together with 0.5 to 1.0 mol of excess unreacted zinc diethyldithiocarbamate.

6. A vulcanization agent comprising an aromatic hydrocarbon solvent solution of the complex addition product of two mols of zinc dibutyldithiocarbamate and one mol of dipentamethylenethiuramtetrasulfide together with 0.5 to 1.0 mol of excess unreacted zinc dibutyldithiocarbamate.

7. A vulcanization agent comprising an aromatic hydrocarbon solvent solution of the complex addition product of two mols of zinc dibutyldithiocarbamate and one mol of tetraethylthiuramdisulfide together with 0.5 to 1.0 mol of excess unreacted zinc dibutyldithiocarbamate.

8. A vulcanization agent comprising an aqueous dispersion of the complex addition product of two mols of a zinc salt of a dialkyl dithiocarbamate wherein the alkyl group has from one to four carbon atoms and one mol of a thiuram sulfide having the following formula:

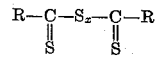

where $x$ is an even number not greater than four and R is a member of the group consisting of piperidyl and dialkyl amino groups wherein the alkyl group has not more than four carbon atoms.

9. A vulcanization agent comprising an aqueous dispersion of an aromatic hydrocarbon solvent solution of the complex addition product of two mols of zinc diethyldithiocarbamate and one mol of dipentamethylenethiuramtetrasulfide together with 0.5 to 1.0 mol of excess unreacted zinc diethyldithiocarbamate.

10. A vulcanization agent comprising an aqueous dispersion of an aromatic hydrocarbon solvent solution of the complex addition product of two mols of zinc dibutyldithiocarbamate and one mol of dipentamethylenethiuramtetrasulfide together with 0.5 to 1.0 mol of excess unreacted zinc dibutyldithiocarbamate.

11. A vulcanization agent comprising an aqueous dispersion of an aromatic hydrocarbon solvent solution of the complex addition product of two mols of zinc dibutyldithiocarbamate and one mol of tetraethylthiuramdisulfide together with 0.5 to 1.0 mol of excess unreacted zinc dibutyldithiocarbamate.

THOMAS C. MORRIS.
ERIC C. JOHNSON.

References Cited in the file of this patent

UNITED STATES PATENTS

| Number | Name | Date |
|---|---|---|
| 1,681,717 | Whitby et al. | Aug. 21, 1928 |
| 1,867,982 | Naunton et al. | July 19, 1932 |
| 1,972,961 | Tisdale | Sept. 11, 1934 |
| 2,004,059 | Bollman et al. | June 4, 1935 |
| 2,048,043 | Williams et al. | July 21, 1936 |
| 2,058,246 | McCortney | Oct. 20, 1936 |
| 2,090,629 | Hiers et al. | Aug. 24, 1937 |
| 2,129,621 | Lichty | Sept. 6, 1938 |
| 2,321,301 | Lichty | June 8, 1943 |
| 2,356,172 | Mathes | Aug. 22, 1944 |